US012579627B2

(12) United States Patent  
Bargoti et al.

(10) Patent No.: US 12,579,627 B2  
(45) Date of Patent: Mar. 17, 2026

(54) METHOD AND SYSTEM FOR DETECTING PHYSICAL FEATURES OF OBJECTS

(71) Applicant: Abyss Solutions Pty Ltd, Homebush (AU)

(72) Inventors: Suchet Bargoti, Homebush (AU); Toby Francis Dunne, Homebush (AU); Vsevolod Vlaskine, Homebush (AU); Eric Leonard Ferguson, Homebush (AU); Nasir Ahsan, Homebush (AU); Masood Naqshbandi, Homebush (AU); Steven Potiris, Homebush (AU)

(73) Assignee: Abyss Solutions Pty Ltd, Homebush (AU)

( * ) Notice: Subject to any disclaimer, the term of this patent is extended or adjusted under 35 U.S.C. 154(b) by 765 days.

(21) Appl. No.: 17/787,202

(22) PCT Filed: Dec. 16, 2020

(86) PCT No.: PCT/AU2020/051379  
§ 371 (c)(1),  
(2) Date: Jun. 17, 2022

(87) PCT Pub. No.: WO2021/119739  
PCT Pub. Date: Jun. 24, 2021

(65) Prior Publication Data  
US 2023/0052727 A1 Feb. 16, 2023

(30) Foreign Application Priority Data  
Dec. 17, 2019 (AU) ................................ 2019904762

(51) Int. Cl.  
*G06T 7/00* (2017.01)  
*G06T 3/40* (2006.01)  
(Continued)

(52) U.S. Cl.  
CPC .............. *G06T 7/0004* (2013.01); *G06T 3/40* (2013.01); *G06T 5/70* (2024.01); *G06T 7/11* (2017.01);  
(Continued)

(58) Field of Classification Search  
CPC ..... G06T 3/40; G06T 5/70; G06T 7/11; G06T 7/155; G06V 10/25  
See application file for complete search history.

(56) References Cited

U.S. PATENT DOCUMENTS

| | | | |
|---|---|---|---|
| 6,771,834 B1* | 8/2004 | Martins | G06T 7/11 |
| | | | 382/257 |
| 8,515,172 B2 | 8/2013 | Varekamp | |
| 2021/0133496 A1* | 5/2021 | Barnehama | G06F 18/41 |

FOREIGN PATENT DOCUMENTS

| | | |
|---|---|---|
| WO | WO 2017/027475 | 2/2017 |
| WO | WO 2017/091833 | 6/2017 |

(Continued)

OTHER PUBLICATIONS

Cheng et al., "Automated detection of sewer pipe defects in closed circuit television images using deep learning techniques," retrieved from the Internet Nov. 12, 2020, retrieved from URL <https://www.researchgate.net/publication/32770209 1 _Automated_ detection_ of _sewer_pipe_defects_in_closedcircuit_television_images_using_ deep_learning_techniques>, abstract only.

(Continued)

*Primary Examiner* — John R Wallace  
(74) *Attorney, Agent, or Firm* — Fish & Richardson P.C.

(57) ABSTRACT  
A computer can operated, including detecting defects, or other physical features, of artificial objects. Image data is received of one or more artificial objects, and applying an image segmentation process to the image data to detect predetermined defects of the one or more artificial objects. The image segmentation process identifies one or more (Continued)

regions of the image data determined to have a likelihood of showing one or more of the predetermined defects. The identified one or more regions is output. The image segmentation process determines severity metrics for the defects in the one or more regions, wherein a severity metric represents a severity or significance of a defect. The image segmentation process further determines a confidence factor for each region of the one or more regions, wherein the confidence factor represents a likelihood of the presence of a predetermined defect in the region.

30 Claims, 15 Drawing Sheets

(51) Int. Cl.
| | |
|---|---|
| *G06T 5/70* | (2024.01) |
| *G06T 7/11* | (2017.01) |
| *G06T 7/155* | (2017.01) |
| *G06V 10/25* | (2022.01) |

(52) U.S. Cl.
CPC .............. *G06T 7/155* (2017.01); *G06V 10/25* (2022.01); *G06T 2207/20084* (2013.01); *G06T 2207/20132* (2013.01)

(56) References Cited

FOREIGN PATENT DOCUMENTS

| WO | WO 2018/165753 | 9/2018 | |
| WO | WO 2019/157288 | 8/2019 | |
| WO | WO-2019157288 A1 * | 8/2019 | ........... G06K 9/3241 |

OTHER PUBLICATIONS

International Search Report and Written Opinion in International Appln. No. PCT/AU2020/051379, dated Jan. 29, 2021, 4 pages.

Nash et at., "Quantity beats quality for semantic segmentation of corrosion in images," Jul. 10, 2018, retreived on Nov. 12, 2020, retrieved from URL <https://arxiv.org/abs/1807.03138>, 10 pages.

Sinha et al., "Morphological segmentation and classification of underground pipe images," Apr. 2006, Machine Vision and Applications, vol. 17, issue 1, pp. 21-31.

Tennakoon et al., "Visual Inspection of Storm-Water Pipe Systems using Deep Convolutional Neural Networks," Proceedings of the 15th International Conference on Informatics in Control, Automatic and Robotics (ICINCO 2018), vol. 1, pp. 135-140.

Cheng et al., "Automated detection of sewer pipe defects in closed-circuit television images using deep learning techniques," Automation in Construction, Elsevier, Aug. 27, 2018, vol. 95, 17 pages.

Hoang et al., "Image Processing-Based Detection of Pipe Corrosion Using Texture Analysis and Metaheuristic-Optimized Machine Learning Approach," Computational Intelligence and Neuroscience, Jul. 11, 2019, 14 pages.

Nash et al., "A review of deep learning in the study of materials degradation," NPJ Materials Degradation, Nov. 15, 2018, 2(1): 12 pages.

Nash et al., "Automated Corrosion Detection Using Crowd Sourced Training for Deep Learning," Submitted on Aug. 4, 2019, arXiv:1908.02548, 13 pages.

Extended European Search Report in European Appln. No. 20903011.3, mailed on Dec. 13, 2023, 14 pages.

* cited by examiner

FIGURE 1

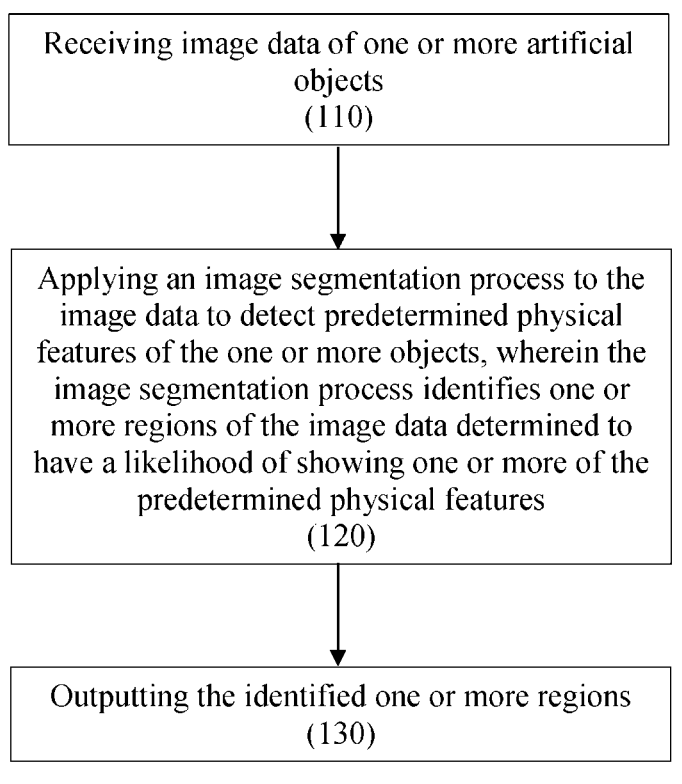

Receiving image data of one or more artificial objects
(110)

Applying an image segmentation process to the image data to detect predetermined physical features of the one or more objects, wherein the image segmentation process identifies one or more regions of the image data determined to have a likelihood of showing one or more of the predetermined physical features
(120)

Outputting the identified one or more regions
(130)

100

FIGURE 8
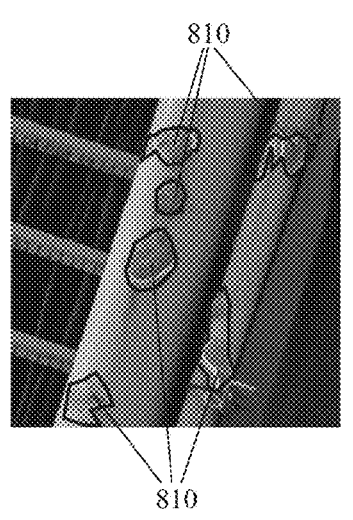
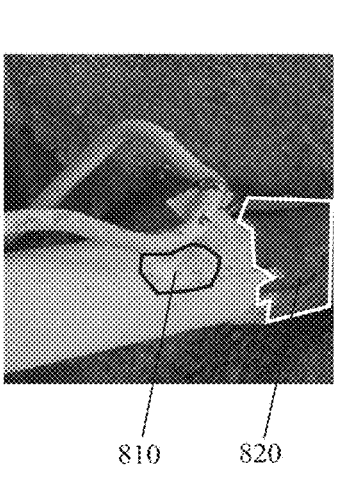
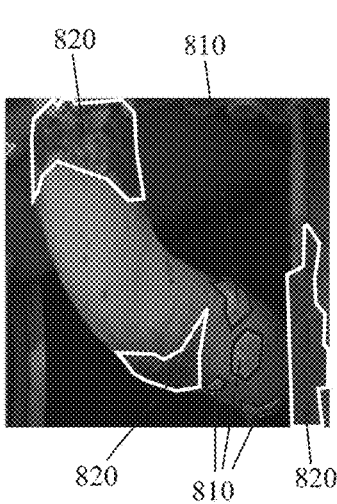

Predicted regions of
corrosion in an image

Morphology operations
merge clustered regions

Further filtering removes
superfluous regions

| ID | Block-Grid/Paint Block | Asset Priority | Corrosion Severity | Inspection Priority | Image(s) |
|----|------------------------|----------------|--------------------|--------------------|----------|
| 02 | A7 | 2 | 2 | 6 | IMG0312.png |
| 03 | G2 | 0 | 1 | 1 | IMG5983.png |
| 04 | K3 | 1 | 2 | 2 | IMG3372.png |
| 05 | C3 | 3 | 2 | 5 | IMG9865.png |
| 07 | F6 | 3 | 3 | 9 | IMG0025.png |
| 08 | K9 | 1 | 0 | 3 | IMG2258.png |
| 10 | J12 | 1 | 1 | 1 | IMG6662.png |
| 11 | S15 | 3 | 2 | 3 | IMG1236.png |

Corresponding image with corrosion detection and classification

FIGURE 14

| ID | Branch | Flange/Valve No | Corrosion Severity | Asset Priority | Inspection Priority |
|----|--------|-----------------|--------------------|----------------|---------------------|
| 02 | 6-SW-909-N2/B1 | 2 | 2 | 3 | 6 |
| 03 | 10-SW-906-N2/B2 | 2 | 1 | 0 | 0 |
| 04 | 2-WP-9297-NM3/CD/B1 | 1 | 2 | 2 | 4 |
| 05 | /FE-7030 | NA | 2 | NA | NA |
| 07 | 4-SW-9224-A-/6 CD/B1 | 1 | 3 | 3 | 9 |
| 08 | 4-SW-9203-N2-/2 CD/B1 | 1 | 0 | 3 | 0 |
| 10 | 10-CM-827-A/B1 | 1 | 1 | 1 | 1 |
| 11 | 6-SW-909-N2/B2 | 3 | 2 | 3 | 6 |

METHOD AND SYSTEM FOR DETECTING PHYSICAL FEATURES OF OBJECTS

TECHNICAL FIELD

This document generally relates to the automatic detection of physical features of objects. In further specific examples, the present document relates to methods and systems for automatically detecting defects of objects.

BACKGROUND

Fabric maintenance (FM) refers to processes or techniques whereby the integrity of assets is monitored and, when defects arise, restored. Processes covered by FM include corrosion management operations, such as painting/coating programs, as well as other processes that are critical to assuring and extending the life of an asset. FM is an integral component of operations in the resource production industry, such as the oil and gas industry in which operators have to maintain numerous assets on offshore platforms for extended periods of time under challenging environmental conditions.

Traditionally, FM processes have required subject matter experts (SMEs) to conduct regular inspections of a site or production facility. The SMEs survey the site, take notes, and collect visual data. The data is then reviewed by the SMEs, typically at an office remote from the site, and organised into an inspection report with a summary of inspection findings. The output of the process is an FM plan for scheduling and executing more detailed inspection tasks or conducting maintenance work such as painting and repairs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The effectiveness of an FM process may depend on the experience and personal opinion of the SMEs who undertake site surveys and review the collected data. For example, different SMEs may hold different views on the severity of a particular trace of corrosion, which in turn leads to sampling bias, variable results, and poor reproducibility. Critically, defects that are incorrectly characterised or detected may have a severely adverse impact on the operation of a production facility.

Moreover, physical surveys and manual review of the data is a time-consuming, labour-intensive process, and site operators can accrue large backlogs of FM, especially on sites with aging facilities.

This document describes new or improved methods and/or systems of detecting physical defects or physical features in an object or a structure.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

According to an example aspect, there is provided a computer-implemented method comprising: receiving image data of one or more objects; applying an image segmentation process to the image data to detect predetermined physical features of the one or more objects, wherein the image segmentation process identifies one or more regions of the image data determined to have a likelihood of showing one or more of the predetermined physical features; and outputting the identified one or more regions.

In certain embodiments, the physical features are defects of the one or more objects. In certain embodiments, the defects comprise at least one of corrosion, a crack, a blister, a bend, and a deformation in the one or more objects. In certain embodiments, the image segmentation process determines severity metrics for the defects in the identified regions, wherein a severity metric represents a severity or significance of a defect.

In certain embodiments, the image segmentation process determines a confidence factor for each region of the one or more regions, wherein the confidence factor represents a likelihood of the presence of a predetermined physical feature in the region.

In certain embodiments, the image data is visual image data, thermal image data, hyperspectral image data, or 2D depth image data. In certain embodiments, the image data comprises one or more images, wherein each image of the one or more images shows at least one object of the one or more objects. In certain embodiments, the one or more images are frames of a video, photographs, 2D images, 3D images, or spherical images. In certain embodiments, prior to applying the image segmentation process, the method further comprises a step of processing the one or more images to emphasise visual indications of the predetermined physical features. In certain embodiments, processing the one or more images comprises at least one of applying undistortion filters, brightening the images, adjusting a contrast of the images, resizing the images to a predetermined image size, cropping the images to retain predetermined areas of the images, image smoothing, applying a normalisation operation, applying a multiplication or convolution operation, applying a spatial filter, and applying a geometrical transformation to the image data.

In certain embodiments, the image segmentation process is implemented by a region-based segmentation process, a mathematical morphology segmentation, a genetic algorithm-based segmentation, an artificial neural network-based segmentation, or a deep learning structure.

In certain embodiments, each region of the one or more regions comprises a plurality of pixels that are spatially adjoining. In certain embodiments, the method further comprises: merging the two or more regions of the identified regions into a single region; and outputting the single region. In certain embodiments, regions of the one or more regions that have a size smaller than a size threshold are not outputted.

In certain embodiments, the method further comprises receiving metadata of the one or more objects, wherein the metadata is associated with the image data. In certain embodiments, the metadata comprises spatial metadata. In certain embodiments, the metadata comprises labels of the one or more objects. In certain embodiments, outputting the identified one or more regions comprises: associating each region of the one or more regions with the metadata; aggregating the one or more regions based on characteristics of the metadata; and storing the aggregated one or more regions into a database of the predetermined physical features. In certain embodiments, the method further comprises: receiving risk profiles associated with the characteristics of the metadata; ranking the one or more regions based on the risk profiles of the characteristics of the metadata associated with each region of the one or more regions; and outputting a prioritisation table containing the one or more regions.

In certain embodiments, the method further comprises: receiving 3D spatial data of the one or more objects, wherein the 3D spatial data is associated with the image data; and generating a 3D representation of the one or more regions and the one or more objects using the 3D spatial data.

In certain embodiments, the method further comprises: automatically identifying regions of uncertainty, wherein the regions of uncertainty are regions of the one or more regions in which the likelihood of showing one or more of the predetermined physical features is below a likelihood threshold, or regions of the one or more regions having high entropy, or regions of the one or more regions representing samples near decision boundaries of the image segmentation process; reviewing, by an operator, the regions of uncertainty; in response to the one or more regions not having been correctly identified by the image segmentation process, marking on the image data one or more corrected regions showing one or more predetermined physical features; and training the image segmentation process using the marked imaged data.

In certain embodiments, the image segmentation process is trained by using at least one of: a definition of a physical feature provided by a user; image data showing the predetermined physical features; and image data of the one or more objects in which the predetermined physical features have been marked by a user.

In certain embodiments, the method further comprises generating an operational success metric based on a determination of an impact of detecting one or more predetermined physical features of the one or more objects, a severity classification of the one or more predetermined physical features, and errors in the identification of the one or more regions.

According to another example aspect, there is provided a system comprising at least one processing system configured to: receive image data of one or more objects; apply an image segmentation process to the image data to detect predetermined physical features of the one or more objects, wherein the image segmentation process identifies one or more regions of the image data determined to have a likelihood of showing one or more of the predetermined physical features; and output the identified one or more regions.

In certain embodiments, the physical features are defects of the one or more objects. In certain embodiments, the defects comprise at least one of corrosion, a crack, a blister, a bend, and a deformation in the one or more objects. In certain embodiments, the image segmentation process determines severity metrics for the defects in the identified regions, wherein a severity metric represents a severity or significance of a defect.

In certain embodiments, the image segmentation process determines a confidence factor for each region of the one or more regions, wherein the confidence factor represents a likelihood of the presence of a predetermined physical feature in the region.

In certain embodiments, the image data is visual image data, thermal image data, hyperspectral image data, or 2D depth image data. In certain embodiments, the image data comprises one or more images, wherein each image of the one or more images shows at least one object of the one or more objects. In certain embodiments, the one or more images are frames of a video, photographs, 2D images, 3D images, or spherical images. In certain embodiments, prior to applying the image segmentation process, the at least one processing system is further configured to process the one or more images to emphasise visual indications of the predetermined physical features. In certain embodiments, processing the one or more images comprises at least one of applying undistortion filters, brightening the images, adjusting a contrast of the images, resizing the images to a predetermined image size, cropping the images to retain predetermined areas of the images, image smoothing, applying a normalisation operation, applying a multiplication or convolution operation, applying a spatial filter, and applying a geometrical transformation to the image data.

In certain embodiments, the image segmentation process is implemented by a region-based segmentation process, a mathematical morphology segmentation, a genetic algorithm-based segmentation, an artificial neural network-based segmentation, or a deep learning structure.

In certain embodiments, each region of the one or more regions comprises a plurality of pixels that are spatially adjoining. In certain embodiments, the at least one processing system being further configured to: merge the two or more regions of the identified regions into a single region; and output the single region. In certain embodiments, regions of the one or more regions that have a size smaller than a size threshold are not outputted.

In certain embodiments, the at least one processing system is further configured to receive metadata of the one or more objects, wherein the metadata is associated with the image data. In certain embodiments, the metadata comprises spatial metadata. In certain embodiments, the metadata comprises labels of the one or more objects. In certain embodiments, the at least one processing system is further configured to: associate each region of the one or more regions with the metadata; aggregate the one or more regions based on characteristics of the metadata; and store the aggregated one or more regions into a database of the predetermined physical features. In certain embodiments, the at least one processing system is further configured to: receive risk profiles associated with the characteristics of the metadata; rank the one or more regions based on the risk profiles of the characteristics of the metadata associated with each region of the one or more regions; and output a prioritisation table containing the one or more regions. In certain embodiments, the at least one processing system is further configured to: receive 3D spatial data of the one or more objects, wherein the 3D spatial data is associated with the image data; and generate a 3D representation of the one or more regions and the one or more objects using the 3D spatial data.

In certain embodiments, the at least one processing system is further configured to: automatically identify regions of uncertainty, wherein the regions of uncertainty are regions of the one or more regions in which the likelihood of showing one or more of the predetermined physical features is below a likelihood threshold, or regions of the one or more regions having high entropy, or regions of the one or more regions representing samples near decision boundaries of the image segmentation process; send the regions of uncertainty to an operator for review; in response to the one or more regions not having been correctly identified by the image segmentation process, mark on the image data one or more corrected regions showing one or more predetermined physical features; and train the image segmentation process using the marked imaged data.

In certain embodiments, the image segmentation process is trained by using at least one of: a definition of a physical feature provided by a user; image data showing the predetermined physical features; and image data of the one or more objects in which the predetermined physical features have been marked by a user.

In certain embodiments, the at least one processing system is further configured to generate an operational success metric based on a determination of an impact of detecting one or more predetermined physical features of the one or more objects, a severity classification of the one or more predetermined physical features, and errors in the identification of the one or more regions.

According to another example aspect, there is provided a computer-implemented method comprising: receiving image data of one or more artificial objects; applying an image segmentation process to the image data to detect predetermined defects of the one or more artificial objects, wherein the image segmentation process identifies one or more regions of the image data determined to have a likelihood of showing one or more of the predetermined defects; and outputting the identified one or more regions. The image segmentation process determines severity metrics for the defects in the one or more regions, wherein a severity metric represents a severity or significance of a defect. The image segmentation process further determines a confidence factor for each region of the one or more regions, wherein the confidence factor represents a likelihood of the presence of a predetermined defect in the region.

According to another example aspect, there is provided a system comprising at least one processing system configured to: receive image data of one or more artificial objects; apply an image segmentation process to the image data to detect predetermined defects of the one or more artificial objects, wherein the image segmentation process identifies one or more regions of the image data determined to have a likelihood of showing one or more of the predetermined defects; and output the identified one or more regions. The image segmentation process determines severity metrics for the defects in the one or more regions, wherein a severity metric represents a severity or significance of a defect. The image segmentation process further determines a confidence factor for each region of the one or more regions, wherein the confidence factor represents a likelihood of the presence of a predetermined defect in the region.

Other aspects, features, and advantages will become apparent from the following Detailed Description when taken in conjunction with the accompanying drawings, which are a part of this disclosure and which illustrate, by way of example, principles of the various embodiments.

BRIEF DESCRIPTION OF FIGURES

Example embodiments are apparent from the following description, which is given by way of example only, of at least one non-limiting embodiment, described in connection with the accompanying figures.

FIG. 1 illustrates a block diagram of an example computer-implemented method of detecting physical features of objects.

FIG. 8 illustrates example images showing regions of corrosion identified by the system of FIG. 3.

FIG. 14 illustrates an example table showing equipment and a priority of inspection attributed by the system of FIG. 3.

DETAILED DESCRIPTION

Figure 2:
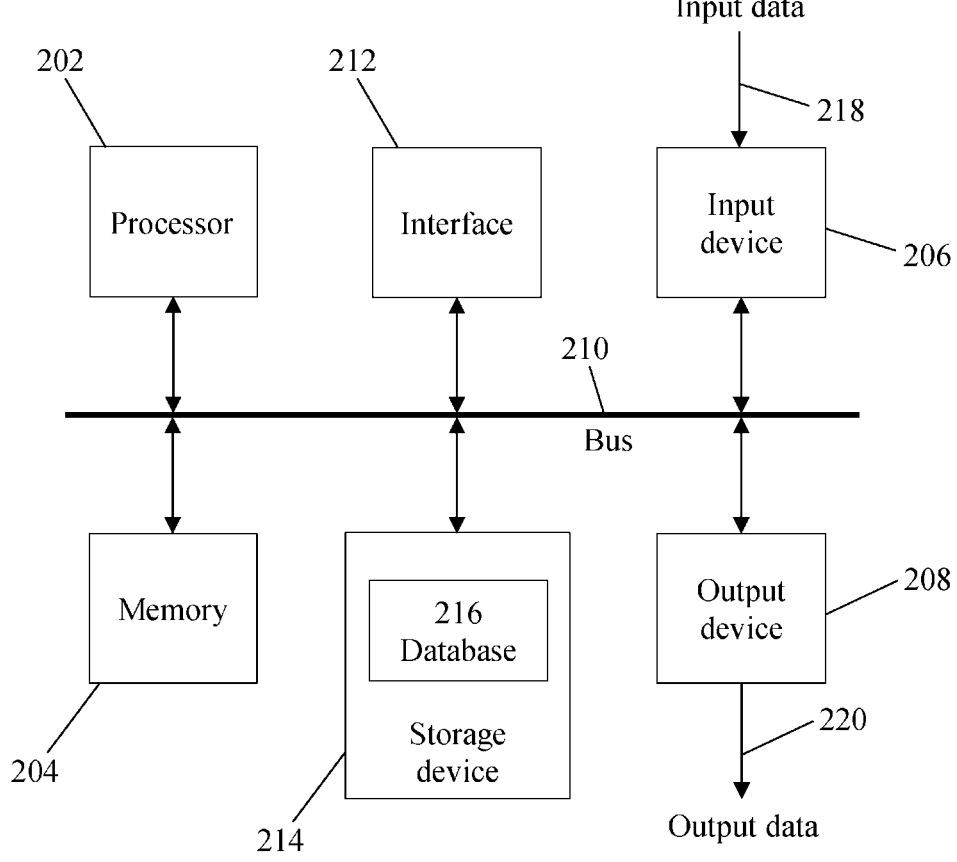
FIG. 2 illustrates a block diagram of an example processing system.

The following modes, given by way of example only, are described in order to provide a more precise understanding of the subject matter of an embodiment or embodiments. In the figures, incorporated to illustrate features of an example embodiment, like reference numerals are used to identify like parts throughout the figures.

Referring to FIG. 1, there is illustrated a computer-implemented method 100. Method 100 may be a method for detecting or identifying physical features, such as defects, of one or more artificial objects.

Method 100 comprises a step 110 of receiving or obtaining image data of one or more artificial objects. The image data may be visual image data, thermal image data, hyperspectral image data, two-dimensional (2D) depth image data, or any other type of image data.

In some examples, the image data comprises one or more images, including a plurality of images, with each image showing at least one object (or part of an object) of the one or more objects. In some examples, at least two images of the plurality of images show a same object of the one or more objects. That is, one or more of the objects may be represented in multiple images, for example, from different perspectives or views (e.g. a top view, a front view, a side view, or any other view) and/or with different image resolutions, so that different images may provide different data about the same object. By receiving images representing multiple viewpoints of the same object, it may be possible to reduce or minimise gaps in the image data relating to that object. If multiple images are obtained representing similar views of an object, but with different resolutions, the images may be merged to improve the quality of image data for the object.

An object may be any tangible article, thing, or item. An object may be unitary (i.e. formed by a single entity), or composite, or compound (i.e. formed by several parts or elements). An object may have any size or shape, and it may comprise a structure (such as a building) or part of a structure (such as a wall, a floor, a door, stairs, or a railing). In some examples, the object is a pipe, a pipeline, a cable, or a valve. In some examples, the object is an item or piece of equipment (including mechanical, electrical, or electro-mechanical equipment), such as a crane or a pump. In some examples, the object is any asset on an offshore platform, such as an oil or gas platform or offshore drilling rig, an onshore production facility, a construction site, a bridge, a dam, a canal, a chemical plant, a ship or other shipping sector facility, or any other site or facility. In some examples, the object is an entire offshore platform. An artificial object is any object made or manufactured by human beings, such as a product.

In some examples, the images represent a scene, which may comprise various elements such as equipment, structure, flooring, personnel, or objects more generally. A scene may represent a complex variety of objects.

In some examples, the images comprise one or more photographs of the objects. In some examples, the images comprise one or more frames of a video of the objects. In some examples, the images comprise one or more 2D images of the objects. In some examples, the images comprises one or more three-dimensional (3D) images of the objects. In some examples, the images comprise one or more spherical images of the objects.

The images may be associated with location or position data (e.g. geo-tagging data), which may be received, along with the image data, to provide an indication of the viewpoint or perspective represented by each image.

Method 100 further comprises a step 120 of applying an image segmentation process to the image data to detect predetermined physical features of the one or more artificial objects, wherein the image segmentation process identifies one or more regions of the image data determined to have a likelihood of showing, indicating, or having a visual indication of one or more of the predetermined physical features. In some examples, step 120 involves the detection, identification, and categorisation of predetermined physical features in the image data.

A physical feature may be a colour, texture, shape, or characteristic of an object. In some examples, a physical feature comprises an element connected to or associated with the object, which may be distinct from the object itself, such as a tag or printed label attached to the object. In some examples, a physical feature is a physical defect of the object.

A defect may be any physical defect, fault, or blemish of one or more objects, or any other mark indicative of a reduced performance or integrity of the object. In some examples, a defect is an external or surface defect that is visible on an exterior side of the object. In other examples, a defect is an internal defect that may manifest itself on an exterior side of the object. In some examples, the defect is corrosion (including active and inactive corrosion). In some examples, the defect is a crack or fracture. In some examples, the defect is a blister. In some examples, the defect is a bend. In some examples, the defect is a deformation.

In some examples, the image segmentation process determines a confidence factor for each region of the one or more regions. In some examples, the image segmentation process determines a confidence factor for each pixel or data point in a region or in the image data. The confidence factor may represent a likelihood of the presence of one or more of the predetermined physical features in the region identified by the image segmentation process. Regions having a confidence factor lower than a predetermined probability threshold may be automatically tagged as not having one of the predetermined physical features or may be sent to an operator for manual review.

In some examples, the image segmentation process determines severity metrics for the defects in the identified regions. A severity metric may represent a severity or significance of a defect. In some examples, the image segmentation process determines a severity/intensity factor for each region of the one or more regions. In some examples, the image segmentation process determines a severity factor of each pixel belonging to a fault, defect, or feature. For example, the image segmentation process may determine a severity factor of identified corrosion in a certain region, representing the severity of the corrosion in that region.

In some examples, the image segmentation process is implemented by a region-based segmentation process, a mathematical morphology segmentation, a genetic algorithm-based segmentation, an artificial neural network-based segmentation, a deep learning structure, or a combination of these.

A region may be an area, sector, or portion of the image data. Therefore, in some examples, a region is a part of an image, although a region may also comprise a whole image. A region may comprise one or more data points or pixels of the image data. In some examples, each region of the one or more regions comprises a plurality of pixels that are adjacent or spatially adjoining.

In some examples, prior to step 120, method 100 further comprises a step of processing images of the image data to emphasise, highlight, or accentuate visual indications of the predetermined physical features. This may done in order to facilitate the identification of regions showing predetermined physical features in step 120. In some examples, processing the images may comprise applying undistortion filters, brightening the images, adjusting a contrast of the images, resizing the images to a predetermined image size, cropping the images to retain predetermined areas of the images, image smoothing, applying a normalisation operation, applying multiplication or convolution operation, applying a spatial filter, applying a geometrical transformation to the image data, or a combination of these.

Method 100 further comprises a step 130 of outputting the identified regions.

In some examples, prior to step 130, method 100 further comprises a step of merging or combining the two or more regions of the identified regions into a single or combined region. The step of merging two or more regions may be performed automatically, without any input or direction by a human operator. Two or more regions may be combined when the distance (e.g. the number of pixels, or true distances calculated using any 3D information) between them is below a predefined amount, so that regions that are found to be sufficiently near to each other are treated as a single region. The two or more regions may be combined using morphological operations. Then, at step 130, the single or combined region is outputted in place of two or more regions that were merged. This may increase the efficiency with which data is outputted by method 100.

In some examples, prior to step 130, any region of the one or more regions that has a size (e.g. a size calculated in terms of a number of pixels) smaller than a size threshold are discarded or otherwise disregarded so that they are not outputted by step 130. For example, regions having a size smaller than 100 pixels may not be outputted. This may increase the efficiency with which data is outputted by method 100, so that defects or physical features that are considered to be small or negligible (i.e. below a predefined size) are disregarded. The size threshold may be predefined or it may be defined dynamically. Moreover, the size threshold may be set manually or it may be calculated as a function of parameters such as range to scene, context of scene, type of image capture device, 3D information, or a combination of these or other parameters.

In some examples, method 100 further comprises a step of receiving metadata or additional data of the one or more objects. The metadata may be associated with the image data. The metadata may comprise data of different categories and/or different modalities (i.e. different types of data). In some examples, the metadata comprises spatial metadata, object identification metadata, defect identification metadata, and defect resolution metadata. In some examples, the spatial metadata comprises 3D spatial data specifying a location in 3D space for each pixel of the image data. In some examples, the spatial metadata comprises computer-aided design (CAD) data, such as a CAD model of the one or more objects, or a 3D LiDAR (light detection and ranging) scan or representation of the one or more objects, or any other 3D model or representation of the one or more objects. In some examples, the metadata comprises labels or tags of the one or more objects, such as data that specifies what object is represented by each pixel of the image data. The labels may provide information on the objects, such as their identity, their function, and their risk profiles. In some examples, the metadata comprises at least one of labels providing information on a defect type, defect category (e.g. corrosion label), labels identifying the one or more artificial objects, and a recommended or possible intervention for resolving a defect.

In some examples, method 100 further comprises steps of associating each region of the one or more regions with the metadata, aggregating the one or more regions based on characteristics or the categories of the metadata, and storing the aggregated one or more regions into a database of the predetermined physical features. The characteristics or categories of the metadata may comprise spatial, temporal, geometrical, or any other attribute of the metadata. The aggregation step may prioritise aggregation of certain categories of metadata. For example, if one of the identified regions is associated with multiple categories of metadata, method 100 may include prioritising one of these categories (e.g. computer aided design CAD spatial metadata) for aggregating the region.

In some examples, method 100 further comprises the steps of receiving risk profiles associated with the characteristics or categories of the metadata, ranking the one or more regions based on the risk profiles of the characteristics or categories of the metadata associated with each region of the one or more regions, and outputting a prioritisation table containing the one or more regions ranked based on the risk profiles of the characteristics or categories of the metadata associated with each region of the one or more regions.

In some examples, method 100 further comprises the step of receiving 3D spatial data (which may be the spatial metadata) of the one or more objects. The 3D spatial data may be associated with the image data. The 3D spatial metadata may comprise 3D spatial metadata of different modalities, such as CAD model metadata and 3D point cloud metadata. Method 100 may further comprise steps of aggregating image data representing different viewpoints or perspectives of a same object of the one or more objects based on the different modalities of the 3D spatial data, and generating a 3D representation of the one or more regions and the one or more structures using the aggregated image data and/or the 3D spatial data. For example, the image data may comprise multiple images of the same object from different viewpoints; by using multiple modalities of 3D spatial metadata as context for multi-view image processes, pixel regions of the images representing the same object or physical area may be aggregated.

In some examples, step 110 may receive 3D models or information of the one or more objects instead of, or in addition to, the image data. In this way, step 120 may deal directly with 3D models, which may facilitate the detection of certain kinds of physical features including defects, such as deformation. For example, a neural network may process 3D models (or 3D images) of the assets and return a degree of deformation (relative to an ideal or satisfactory shape) at each point on the 3D model. In another example, at step 110, 3D information is received and method 100 comprises a further step of converting the 3D data to a "depth map" comprising 2D image data and depth information (e.g. RGB colour channels plus a fourth channel representing depth), which is processed by the neural network.

In some examples, method 100 further comprises the step of automatically identifying regions of uncertainty. The regions of uncertainty may be regions in which the likelihood of showing one or more of the predetermined physical features is below a likelihood threshold, or regions having high entropy, or regions representing samples near decision boundaries of the image segmentation process. Method 100 may further comprise the steps of reviewing, by an operator, the regions of uncertainty, and, in response to the one or more regions not having been correctly identified by the image segmentation process (e.g. an identified region does not actually contain a predetermined physical feature), marking on the image data one or more corrected regions showing one or more predetermined physical features. Method 100 may further comprise a step of training the image segmentation process using the marked imaged data. In this way, the image segmentation process may be re-trained, or trained more than one time, effectively using the trained image segmentation process to inform the operator about which data may need to be marked for refining the operation of the image segmentation process.

In some examples, method 100 further comprises a step of generating one or more evaluation metrics or scores assessing the operation or impact of method 100, rather than machine learning criteria such as pixel perfect performance denoted by mean intersection-over-union (mIOU). In some examples, the evaluation metric is generated based on a determination of impact of detecting one or more predetermined physical features of the one or more objects, a severity classification of the one or more predetermined physical features, and errors in the identification or classification of the one or more regions, such as confusion between classes, misdetections and misfire rates when used by an operator to make decisions.

In some examples, determining the evaluation metric comprises determining an area of intersection or overlap between (i) a region of the one or more regions, and (ii) a region of the image data actually showing the one or more predetermined physical features predicted to be shown in the region of the one or more regions (i.e. the intersection of the predicted region of interest and the true region of interest). The area of intersection may be expressed as a percentage or a fraction of one of the two (or of both) intersecting regions. For example, if the identified region overlaps half of the actual region of the physical feature, the evaluation metric would be 50%. The area of intersection may be calculated for each region of the one or more regions, and an average or other statistical value may be calculated to assess an overall performance of the image segmentation process. This metric, which may be termed the "coverage rate" (further discussed below) may associate one detection or identified region with multiple anomalies, which can be a valid operational goal.

In some examples, the image segmentation process is trained by using a definition of a physical feature provided by a user. In some examples, the image segmentation process is trained by using image data showing predetermined physical features. In some examples, the image segmentation process is trained by using image data of the one or more objects in which predetermined physical features have been marked by a user.

In some examples, method 100 requires no manual feature extraction or human annotation of the image data, and the image segmentation process is an end-to-end process receiving nothing other than the raw image data to output the identified regions.

Therefore, method 100 may enable consistent quality of defect detection and may expedite and facilitate the process of defect detection or feature detection more generally.

In some examples, there is provided a system comprising at least one processing system. The system may be a system for detecting or identifying physical features, such as defects, of one or more artificial objects. The at least one processing system may be configured to receive or obtain image data of one or more artificial objects, and to apply an image segmentation process to the image data to detect predetermined physical features of the one or more artificial objects. The image segmentation process may be configured to identify one or more regions of the image data determined to have a likelihood of showing one or more of the predetermined physical defects. The at least one processing system may further be configured to output the identified one or more regions.

It will be appreciated that the term "processing system" may refer to any electronic processing device or system, or computing device or system, or combination thereof (e.g. computers, web servers, smart phones, laptops, microcontrollers, etc.), and may include a cloud computing system. The processing system may also be a distributed system. In general, processing/computing systems may include one or more processors (e.g. CPUs, GPUs), memory componentry, and an input/output interface connected by at least one bus. They may further include input/output devices (e.g. keyboard, displays, etc.). It will also be appreciated that processing/computing systems are typically configured to execute instructions and process data stored in memory (i.e. they are programmable via software to perform operations on data).

Referring to FIG. 2, there is illustrated an example processing system 200 suitable for implementing method 100 or a system for detecting defects. In particular, the processing system 200 generally includes at least one processor 202, or processing unit or plurality of processors, memory 204, at least one input device 206 and at least one output device 208, coupled together via a bus or group of buses 210. In certain embodiments, input device 206 and output device 208 could be the same device. An interface 212 can also be provided for coupling the processing system 200 to one or more peripheral devices, for example interface 212 could be a PCI card or PC card. At least one storage device 214 which houses at least one database 216 can also be provided. The memory 204 can be any form of memory device, for example, volatile or non-volatile memory, solid state storage devices, magnetic devices, etc. The processor 202 could include more than one distinct processing device, for example to handle different functions within the processing system 200.

Input device 206 receives input data 218 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 218 could come from different sources, for example keyboard instructions in conjunction with data received via a network. Output device 208 produces or generates output data 220 and can include, for example, a display device or monitor in which case output data 220 is visual, a printer in which case output data 220 is printed, a port for example a USB port, a peripheral component adaptor, a data transmitter or antenna such as a modem or wireless network adaptor, etc. Output data 220 could be distinct and derived from different output devices, for example a visual display on a monitor in conjunction with data transmitted to a network. A user could view data output, or an interpretation of the data output, on, for example, a monitor or using a printer. The storage device 214 can be any form of data or information storage means, for example, volatile or non-volatile memory, solid state storage devices, magnetic devices, etc.

In use, the processing system 200 is adapted to allow data or information to be stored in and/or retrieved from, via wired or wireless communication means, the at least one database 216. The interface 212 may allow wired and/or wireless communication between the processing unit 202 and peripheral components that may serve a specialised purpose. The processor 202 receives instructions as input data 218 via input device 206 and can display processed results or other output to a user by utilising output device 208. More than one input device 206 and/or output device 208 can be provided. It should be appreciated that the processing system 200 may be any form of terminal, server, specialised hardware, or the like.

Figure 3:
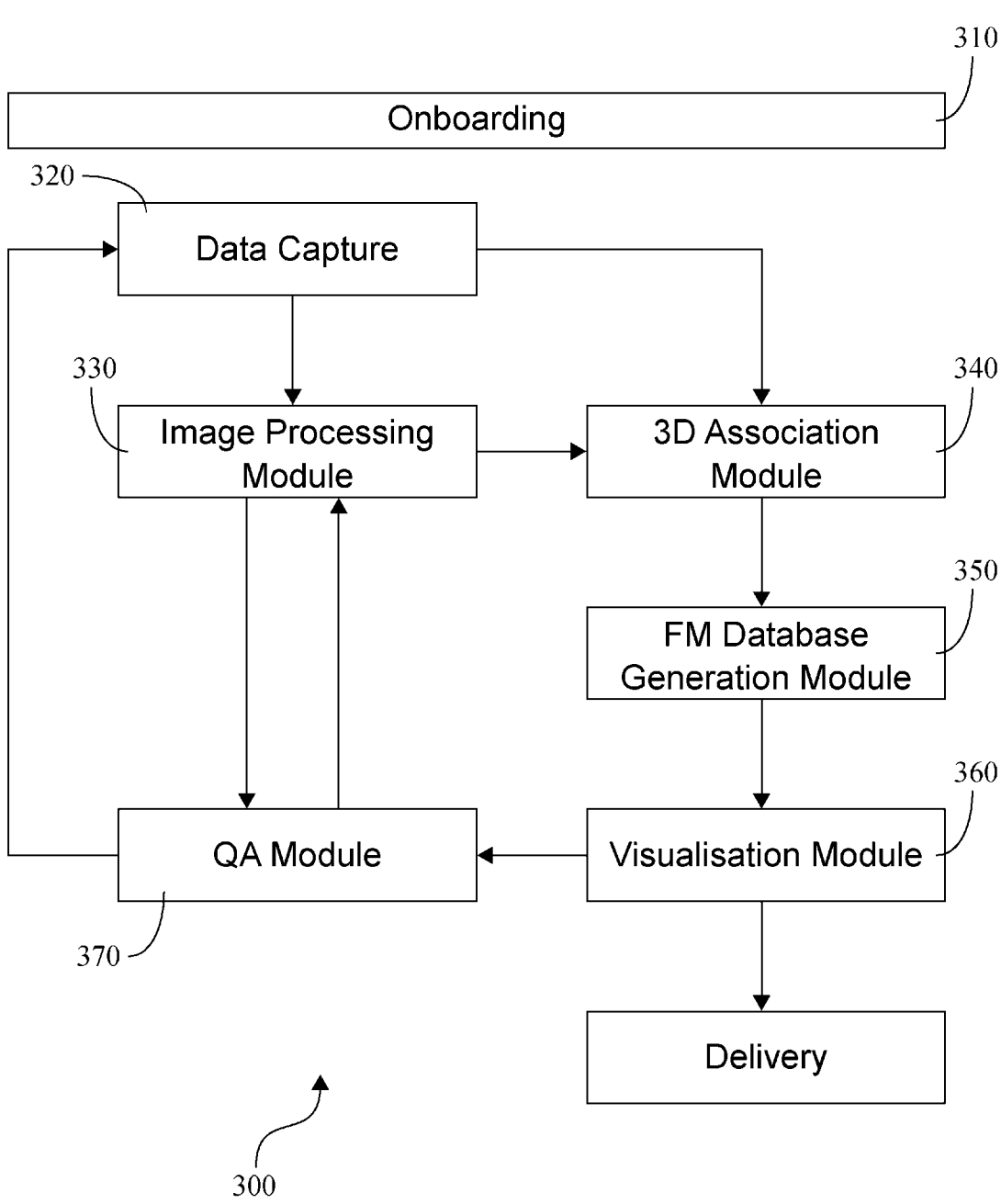
FIG. 3 illustrates a block diagram of an example system for detecting physical features of objects.

Referring to FIG. 3, there is illustrated an example system 300 for detecting physical features, such as defects, in one or more objects. System 300 may be configured to produce a complete digital representation, which is spatially accurate, and is available as a fly-through for operators to explore without being at the facility themselves. System 300 may be a corrosion management tool for fabric maintenance, and it may be deployed in commercial offshore projects for the oil and/or gas industry for the assessment of topside of oil platforms. System 300 may include a software service that consumes digital data of a production facility and returns a defect or fault database to facilitate asset management. System 300 may also be deployed on "edge", so as to be accessible through an edge device (e.g. a tablet computer or mobile device) when an operator is at the facility.

System 300 may include a client onboarding 310 process or module. This process establishes how the software will be tuned to integrate with a current client asset management workflow.

When delivering an automated inspection service for corrosion management and planning in the offshore industry, the output from the analytics needs to be aligned with the current operational workflow and procedures for particular clients. This involves feature-understanding from field subject matter experts and conversion of that understanding to a format the analytics model can digest. For example, an operator may need to make decisions on occurrences of heavy and moderate corrosion on an offshore platform. The onboarding stage would then capture the definition of heavy and moderate corrosion for the particular client (can change client to client) by unpacking current documentations on corrosion definition and conducting a series of questionnaires to capture the subject matter expert's (SME) interpretation on the corrosion definition. These questionnaires help evaluate fault definition and also capture any subjective variances between SMEs. The output from the questionnaire may then be used to tune the image processing module (described below) of system 300.

Additional onboarding 310 procedures may include designing health metrics for operational decisions. For example, one client may be interested in painting entire areas of an offshore platform, and therefore may need to know the total surface area of corrosion in a given area. Aggregated metrics will therefore be designed to reflect this. Another workflow may involve painting individual equipment components depending on how corroded they are. Therefore metric aggregation will be done component-wise.

In order to build a priority queue for facilitating work orders, client onboarding 310 may also include capturing risk profiles of the different equipment on the production facility. For example, corrosion on the thin pipelines carrying high value material poses a significantly higher risk than corrosion on the floor and railings. Therefore, as part of the onboarding process 310, all unique equipment tags may be collected and their risk profiles noted.

In some examples, client onboarding 310 also includes workflow integration beyond the inspection database generation. This includes establishing and integrating with existing operational processes, which can utilise the asset health information output from system 300 to make decisions. For example, the generated fault database can be integrated with existing client asset management software (such as Maximo R), which are used to generate, organise and execute work orders.

System 300 may further include a data capture 320 process or module. Data capture 320 may involve surveying offshore platforms comprehensively using cameras and/or 3D image capture technologies. Data capture 320 may be used for digital transformation of platforms, and its outputs may include flat and/or panoramic images, 3D point clouds, spatial metadata, localisation information for all data points, and/or corresponding CAD models of the assets with associated equipment tags.

System 300 may be configured to recommend particular data capture strategies and/or data quality performed by data capture process 320 for particular analytics.

In some examples, for inspection of an offshore platform, a 360-degree imaging camera, coupled with a laser system can be used to capture data systematically across the platform. For example, an offshore platform with multiple decks would have scan points positioned every 2 to 3 metres from each other. The output would then comprise multiple high-resolution spherical images which have a high dynamic range such that overexposure or underexposure of components is reduced or minimised. Furthermore, the density of the data capture may be selected to ensure maximum coverage and sufficient data resolution, and individual sections may be imaged from multiple perspectives.

Figure 4:
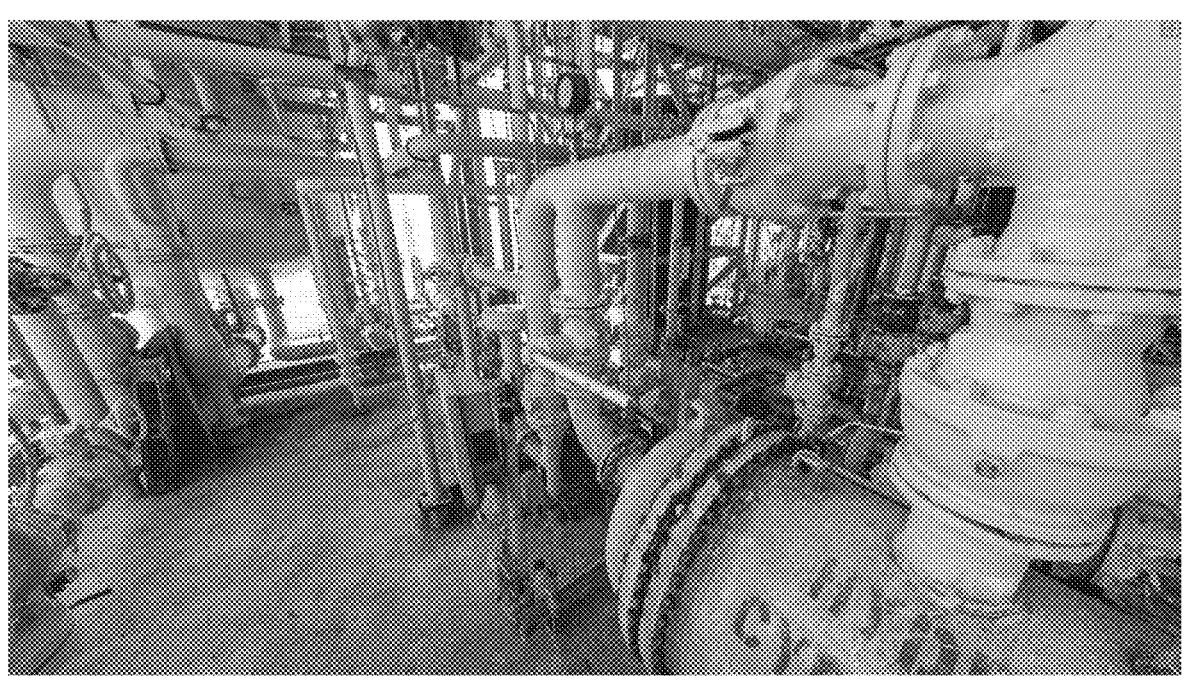
FIG. 4 illustrates an example image obtained by a data capture module of the system of FIG. 3.

Each spherical image may be associated with positional and orientation information in a fixed platform reference frame. Alongside this, a 3D point cloud may be provided in the same reference frame. The reference frames across these data components may be shared, and they may further be the same as the reference frame with an up-to-date CAD model of the platform. Referring to FIG. 4, there is illustrated an example spherical image captured at an offshore production facility.

Referring again to FIG. 3, system 300 may further include an image processing module 330.

Image processing module 330 may be configured to gain an understanding of images captured during the data capture process 320. This understanding can include extracting regions of interest (ROIs) in an automated way, for example, by obtaining an understanding of what is occurring and where it is occurring in an image automatically. A region may be defined as one or more pixels that are connected spatially in some way.

Figure 5:
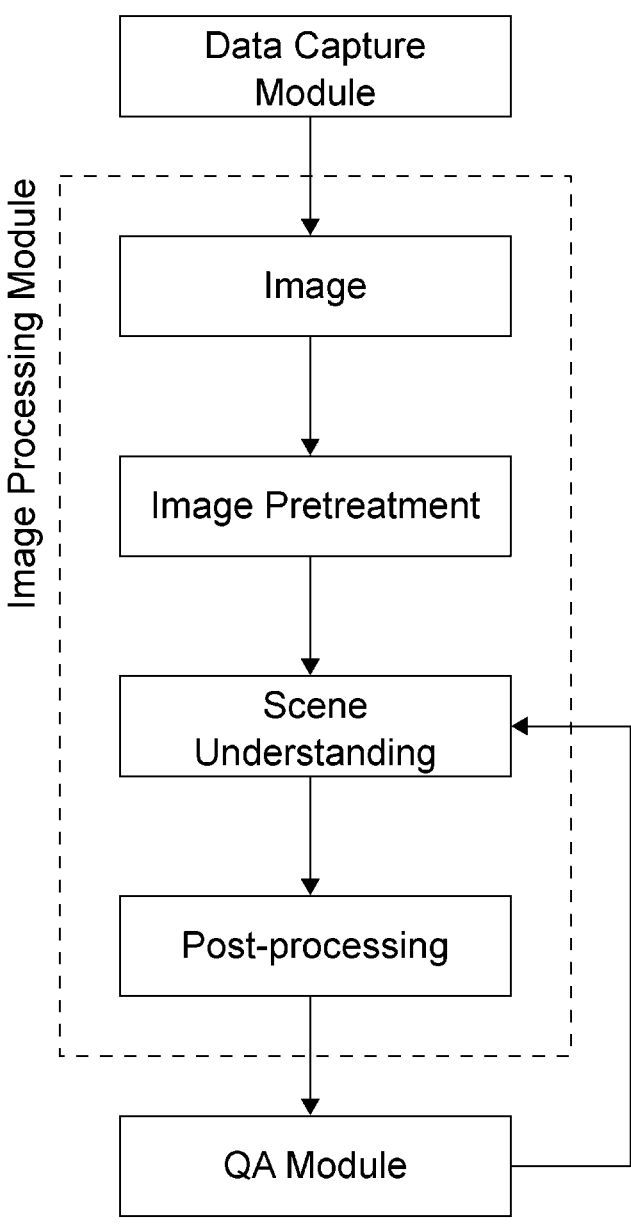
FIG. 5 illustrates an example flowchart of the operation of an image processing module of the system of FIG. 3.

Referring to FIG. 5, there is illustrated an example flowchart showing the operation of image processing module 330, which will be further described next.

Image processing module 330 may perform a pretreatment on the image, such that ROIs are more easily distinguishable from other regions in the image. The pretreatment may include a process of image enhancing or transforming. For example, an image may be pretreated by applying undistortion filters, brightening, and then resizing.

Figure 6:
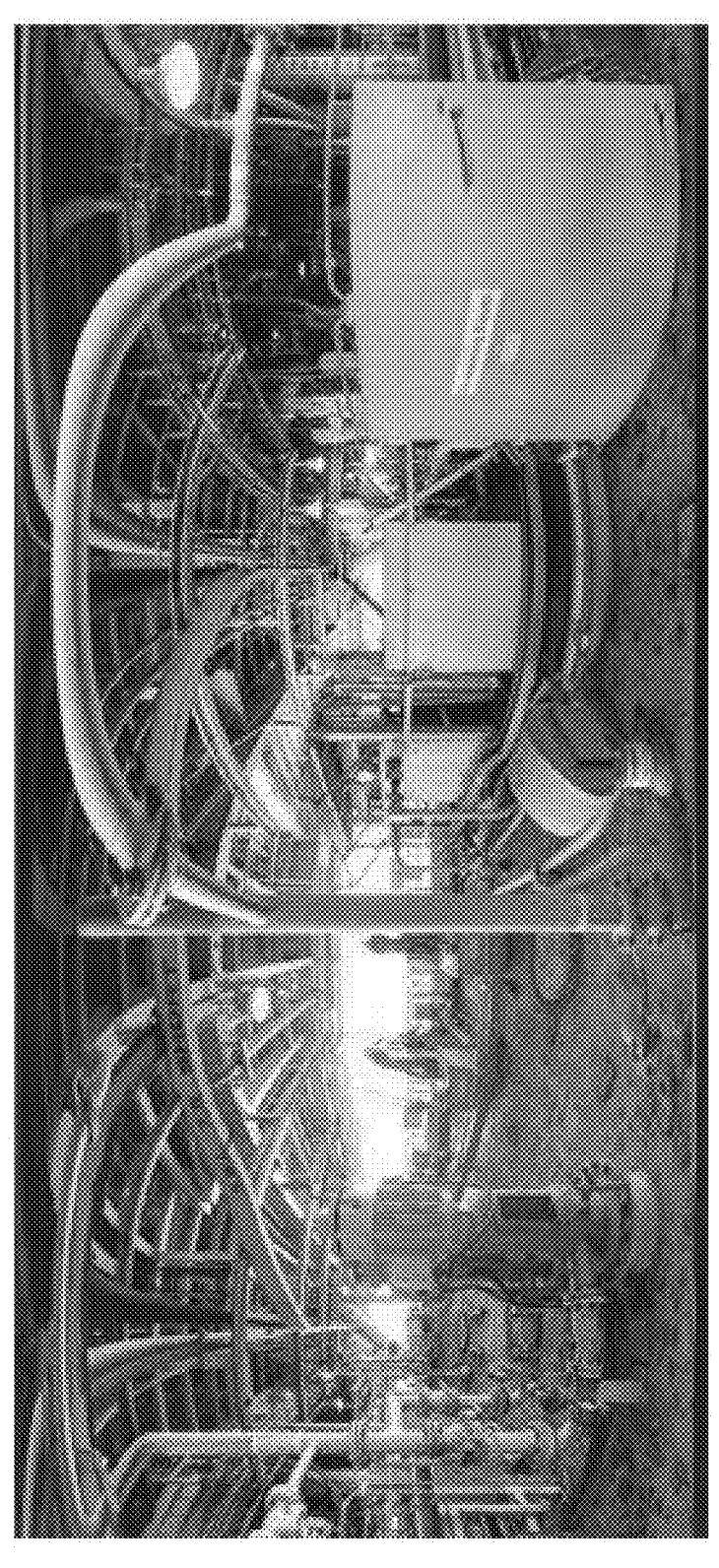
FIG. 6 illustrates an example spherical image obtained by a data capture module of the system of FIG. 3.
Figure 7:
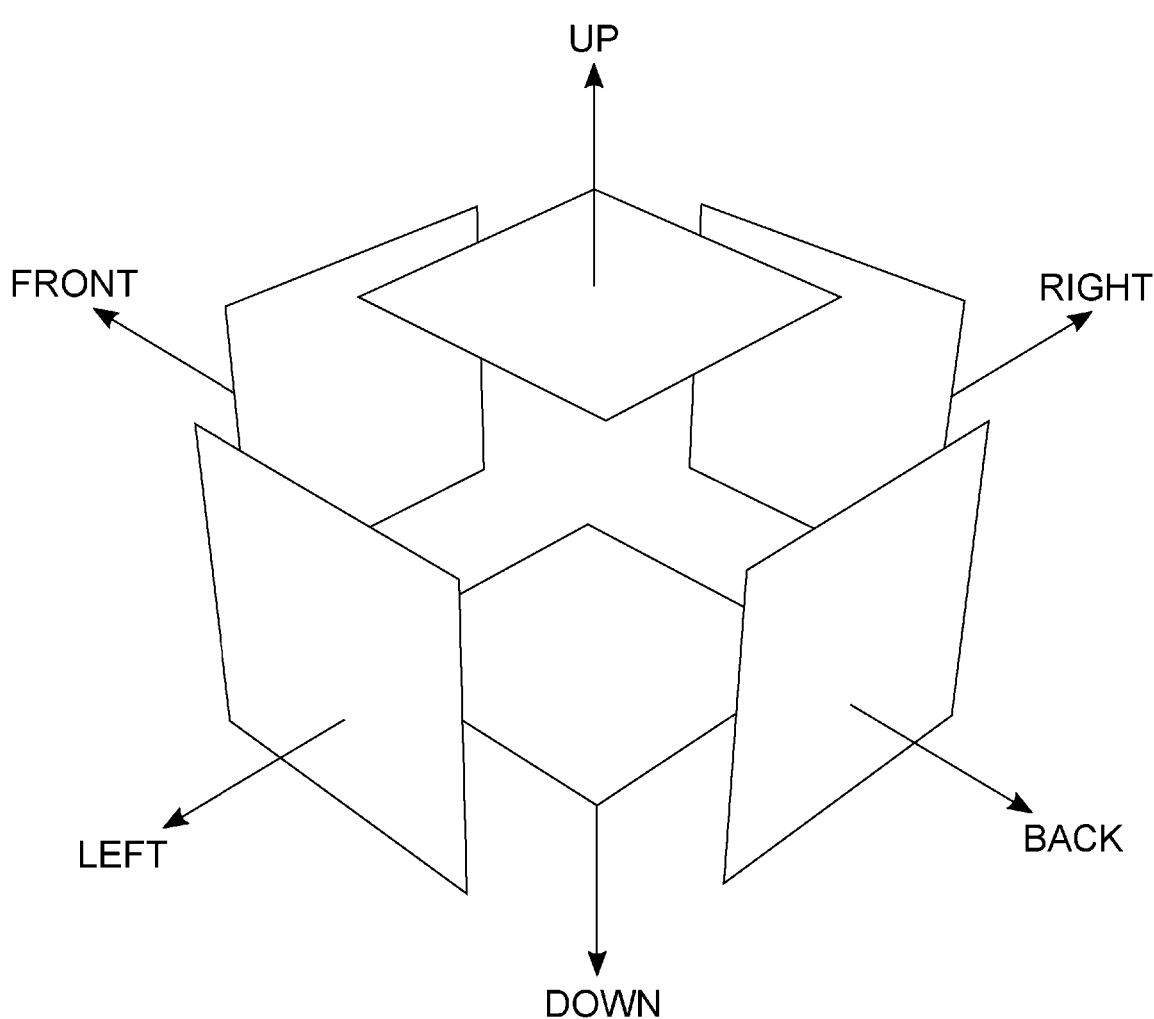
FIG. 7 illustrates an example partitioning of a spherical image into multiple flat images.

In some examples, a 360-degree imaging camera captures spherical images for inspection of an offshore platform (as illustrated in FIG. 6). These images are then divided into square sections (i.e. a cube-map split) and 'flattened' into 2D space, with undistortion filters applied (as illustrated in FIG. 7). Subsequently, each image is resized to a standard size of 4000 pixels by 4000 pixels, or any other size depending on image quality resolution, distance to object, and type of analytics algorithm being used. Each "cube face", or projection of the spherical image, may then be processed by a scene understanding submodule.

Image processing module 330 may further perform scene understanding during which an image potentially including any number of ROIs may be identified based on an image segmentation technique. Image segmentation may be performed by recognising one or more characteristics or features of any number of pixels in the image. Image segmentation may refer to "recognition", "classification", "extraction", "prediction", "regression", or any other process whereby some ROIs or some level of understanding is extracted automatically from regions in an image. Image segmentation can include region-based segmentation, mathematical morphology segmentation, genetic algorithm-based, artificial neural network-based image segmentation framework, or a combination of these processes. Exemplary characteristics or features may include texture, colours, contrast, brightness, or the like, or any combinations thereof in real space, or abstract combinations in feature space.

In some examples, pre-processed images from the image pre-treatment submodule are input through a neural network which performs image segmentation by predicting the severity of corrosion and substrate condition for each pixel and region in the image. The neural network is "trained" by studying sufficient images of example ROIs, in combination with regions of non-interest.

An example of corrosion identification results are shown in FIG. 8. In some examples, in the scene understanding submodule of image processing module 330, a neural network predicts regions and "classes" of corrosion on images, and, for each class, evaluates a strength of severity of corrosion indicative of the significance of that class, including regions of moderate corrosion 810 and regions of heavy corrosion 820.

Image processing module 330 may further perform pretreatment of identified ROIs. Predicted image segmentation regions may be pretreated before further processing. The pretreatment of a single region can include a point operation, a logical operation, an algebra operation, erosion, dilation, and/or smoothing. Regions can also be filtered, merged, and/or simplified.

Figure 9:
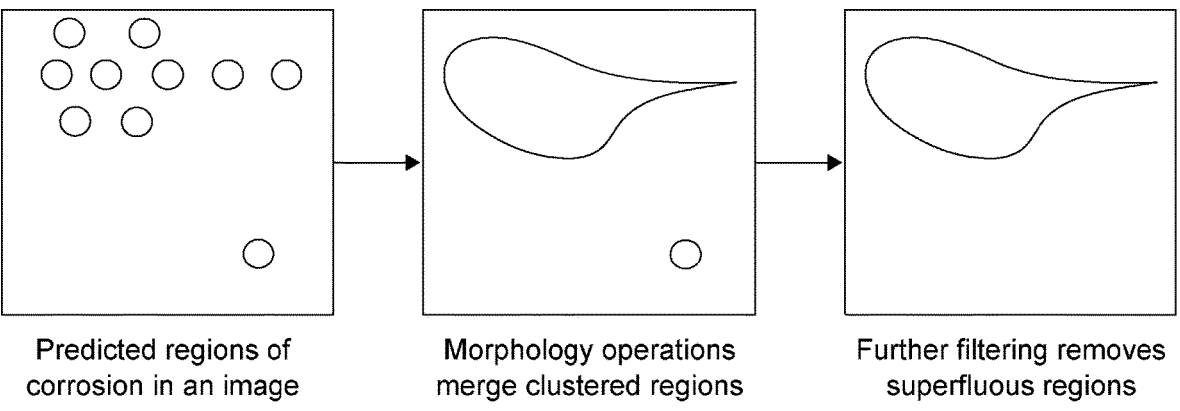
FIG. 9 illustrates an example process whereby proximate regions of corrosion identified by the system of FIG. 3 are merged and regions with a small size are removed.

In some examples, a neural network predicts areas of corrosion by performing image segmentation on a series of images. As illustrated in FIG. 9, in order to merge clusters of small area predictions, a sequence of dilation and erosion morphology operations are applied. Furthermore, to reduce the amount of superfluous predictions, regions with an area having fewer than 100 pixels are removed.

In some examples, a spherical image is captured via data capture process 320. The spherical image has a geometric transform applied to it, turning it from a spherical image into undistorted "flat" images. Images are subsequently normalised and resized. By image processing module 330, the flat images are then input into an image segmentation neural network, which predicts the severity/type/class of corrosion for each pixel/region in the images. The neural network is "trained" by studying sufficient images of example ROIs, and regions of non-interest. This is an iterative process. The predicted ROI are then filtered/cleaned/simplified, and stored/delivered after being processed by a 3D association module (described below). Small area/skinny ROIs are filtered out, and/or neighbouring ROIs are joined together. Proposed ROI edges are smoothed and/or simplified.

Referring again to FIG. 3, system 300 may further include a 3D association module 340. 3D association module 340 may be configured to convert the 2D analytics results produced in the image processing module 330 (in pixel space) to a 3D representation (in physical space), and associate the output of image processing module 330 with spatial and unit metadata from the inspection site. The output of module 340 may be a location and information-aware representation of all findings in the image processing module 330.

Figure 10:
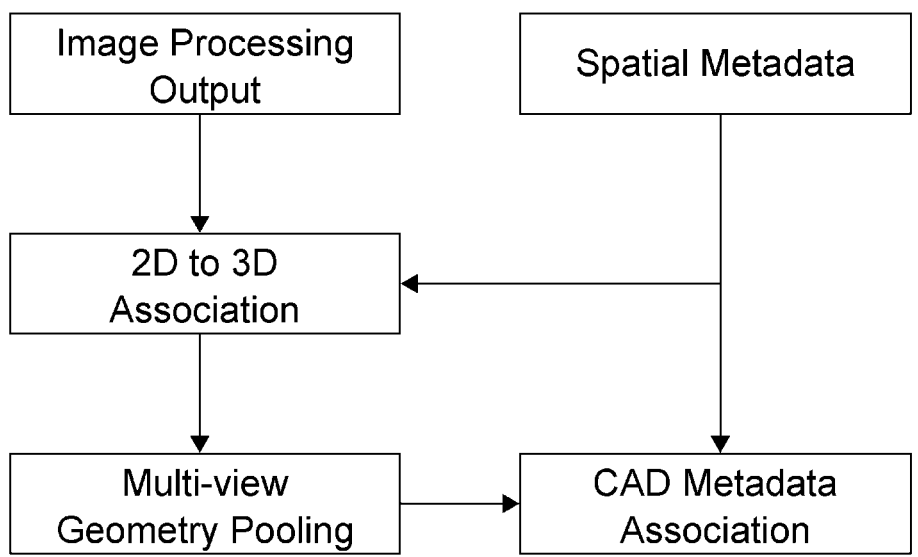
FIG. 10 illustrates an example flowchart of the operation of a 3D association module of the system of FIG. 3.

Referring to FIG. 10, there is illustrated an example flowchart showing the operation of 3D association module 340. Output from image processing module 330 reflects the analytics on individual images. The 2D image data is then mapped to associated 3D information given by the geometry metadata provided during data capture. All processing results are thus associated with 3D information, converting from pixel space to real-world metric space. The multi-view geometry pooling modules fuses information from different images with overlapping or non-overlapping regions. The output from this module is an asset health at all scanned surfaces as represented in 3D space. The areas where data has not been captured, due to obstruction, insufficient coverage or any other reason are quantified and reported. CAD metadata containing equipment IDs are then associated with each feature region. The output is a spatially and information-rich representation of all output from the Image processing module.

Metadata for each scene component may include, but is not limited to, 3D spatial map of detected corrosion, 3D spatial map of areas where image data has not been captured, number and type of corrosion detected, uncertainty in corrosion detection, assessment of scene component health, assessment of recommended scene component intervention, and key measurements including certain point to point distances, surface areas and volumes.

The image processing 330 output is represented in the image pixel space, as a combination of (i, j) pair values. Associated with these values is metadata information regarding the output from the image processing module 330 as described above. Each image is also coupled with spatial metadata, including the intrinsic and extrinsic properties of the image. Furthermore, additional 3D information such as a point cloud representation is injected in the same reference frame. This metadata is presented as part of the data capture process 320. Using a pin-hole camera model, raytracing is conducted on the images to conduct 2D to 3D association. In some examples, for each (i, j) pair under consideration, a 3D representation is evaluated, either as a depth map, or in Cartesian/polar coordinates, e.g. as (x, y, z). The process is repeated exhaustively across the output of the image processing output, resulting in a 3D tagged database of key analytics results from the image processing module 330.

Since data is captured densely, there is often significant overlap on the scene between adjacent images. This results in a 3D surface being observed multiple times from different view-points. Such overlapping observations are then aggregated using an aggregation function such as mean, max or mode pooling functions. The output is then a 3D observation model of the observed areas. Lastly, the output from the multi-view geometry pooling module is fused with a CAD model presented during data capture 320. Given that both the 3D reconstruction data and the CAD model are available in the same reference frame, data points relating to each equipment in the CAD model can be queried, returning the analytics output for the corresponding surfaces. An aggregation step can then be applied to evaluate health metrics for each equipment tag. Aggregation algorithms can be tuned to particular equipment/asset components, such as sum, max, standard deviation, distribution and density pooling. In some examples, the outputs from the 3D association module 340 include (i) each unique ID in the CAD model being associated with image points and the analytics output, and (ii) each image point being associated with a particular surface on the CAD model.

In some examples, when processing data from an offshore platform, the output of image processing module 330 can be represented as pixel-wise segmentation masks over images. Each pixel is therefore tagged with information such as the level of corrosion it has, and additional data such as the certainty of that prediction. Spatial data information from the data capture module 320 is coupled with each image, for example, as a point cloud representation of the scene, and as extrinsic and intrinsic information of the camera setup. For example, associated with each spherical image, there exists its Cartesian location in (x, y, z) and its orientation as roll, pitch, and yaw. By applying a pin-hole image model, each pixel in the image can be projected from the sensor frame to a real-world as a line-ray. This array can be intersected with the point cloud information to convert that pixel into (x, y, z) co-ordinates.

With each pixel denoted in Cartesian co-ordinates, all images can be brought into the same global reference frame. Scene context from multiple images can then be aligned together, with error bounds relating to the uncertainty in the extrinsic and intrinsic information of the imaging system. The information can then be pooled together spatially (as discussed below), or it can be associated with individual equipment tags. Association to equipment tags can be conducted through different pooling techniques, for example, mean pooling calculated mean statistics of analytics on a given equipment tag. More details on collating statistics and metrics is discussed in the operational database module.

Referring again to FIG. 3, system 300 may further include an operational database module 350. Operational database module 350 may be configured to take as input, spatially referenced analytics results, and returns a fault/feature database that is spatially, temporally, or geometrically aggregated. In some examples, operational database module 350 is employed in a production facility to produce a fault database which can be correlated with priority metrics to build a prioritisation table. This prioritisation table can enable risk-based management of assets.

Figure 11:
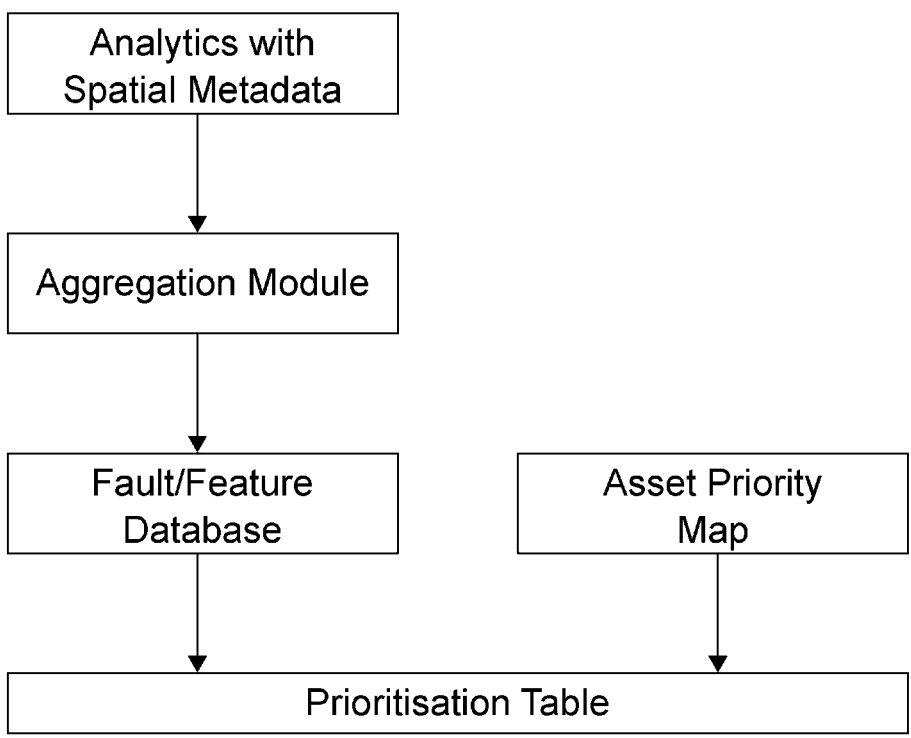
FIG. 11 illustrates an example flowchart of the operation of an operational database module of the system of FIG. 3.

Referring to FIG. 11, there is illustrated an example flowchart showing the operation of operational database module 350. Spatially tagged analytics may be aggregated together to build a fault/feature database. These can then be matched with the priority order of discretized units in the production facility to build a prioritisation table.

Figure 12:
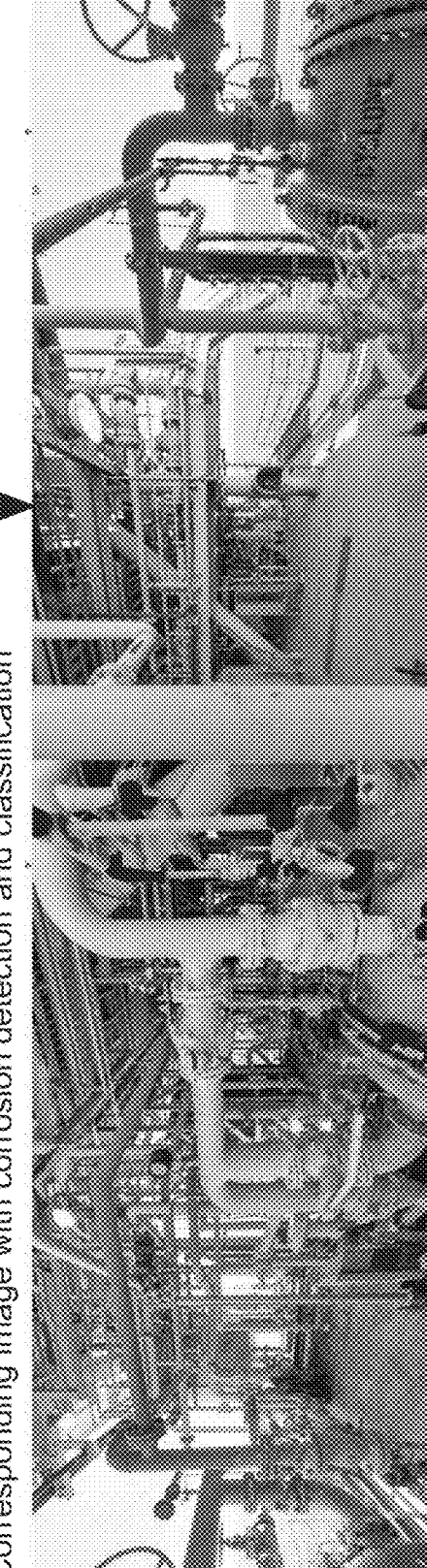
FIG. 12 illustrates a table of regions of corrosion and a spatial heat map showing regions of corrosion identified by the system of FIG. 3.

In some examples, spatial analytics on an offshore platform can be represented as 3D point cloud information, whereby each pixel from each image has been tagged with an (x, y, z) point, has been associated to a 3D CAD model tag, and has also been associated corrosion statistics such as severity and uncertainty. This information can then be pooled using a variety of different metrics depending on the operational needs. For example, painting is scheduled per grid block in an offshore platform, with each deck containing many grids. To pool the information here, the spatial data can be voxelised using a max-pool framework to preserve the worst corrosion severity per voxel. A voxel is a unit cube in 3D space analogous to a pixel in 2D space. Voxels represent a sampled 3D space, spanning the space in (x, y, z) coordinates. The Voxel output can then be sum-pooled across a grid, to demonstrate the total surface area coverage of corrosion in that grid block. Such a database can be represented as a table or a heat map, as shown in FIG. 12, which illustrates the concept of spatial aggregation for corrosion database construction. The top right image shows spatial aggregation per image as a spatial heat-map, and the top left shows the spatial aggregation as a table. Each element of the database may also be linked to an "inspection priority" metric, as provided by the asset SME, which allows for higher priority units to be addressed first if there is an onset of corrosion there.

Figure 13:
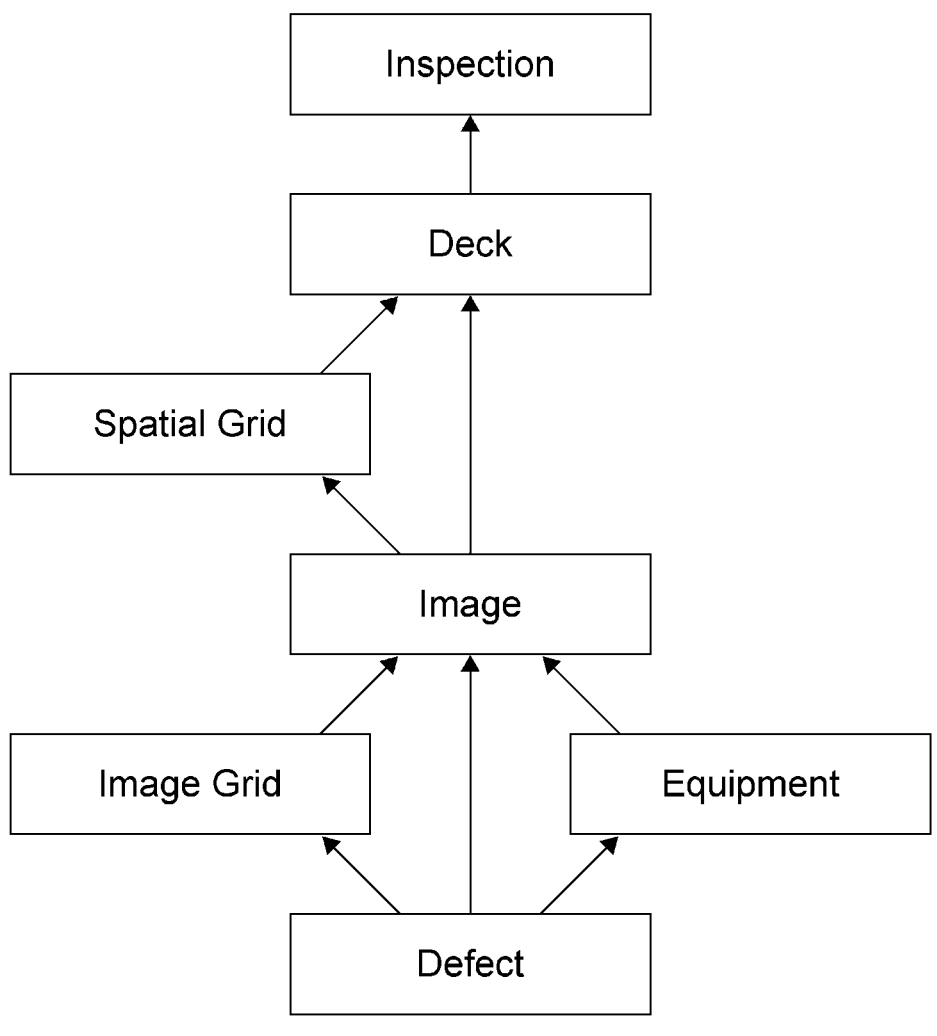
FIG. 13 illustrates an example hierarchy of for ranking regions of corrosion identified by the system of FIG. 3.

Referring to FIG. 13, there is illustrated an example hierarchy of aggregations within the corrosion database, where "Deck" contains "Images" as well as "Spatial Grid" aggregations of images. "Images" contain "Image Grid" aggregations of "Defects" as well as "Equipment".

To build an equipment-based prioritisation table, corrosion statistics can be aggregated per equipment tag in the CAD model. This would involve initial voxelisation, followed by aggregation by equipment ID. Additional statistics such as spread, area coverage, density may be evaluated per equipment tag. FIG. 14 shows a follow up prioritisation table when considering components such as flanges in an offshore platform.

Referring again to FIG. 3, system 300 may further include a visualisation module 360.

The collection of image analytics and corrosion database is delivered to consumers via visualisation module 360, which is configured to enable QA processes (described below), and to deliver risk and priority data.

The visualisation, or image analytics, module 360 may provide a detailed interactive visualisation of captured imagery. Visualisation and interaction pertains to the data fusion of captured imagery, individual fault statistics, equipment information and 3D spatial information.

The interactions with each image location include but are not limited to: the sharing of information pertaining to specific faults or items of equipment (the information shared will have the necessary information to retrieve the relevant visualisation of the fault); provision of multi-perspective image data, via linkage from equipment or fault locations, through associated queries on the relevant image subsets from all available captured imagery, including historical imagery, 3D points and its associated data; quality control of the provided data, allowing for the commenting, addition, deletion and modification of fault information where the feedback is incorporated into updated statistics, as well as continuous improvement of the data processing pipeline.

The spatial information is additionally utilized to provide immersive navigation between images, coupled with a contextual map indicating height location within the platform as well as the local plan view location within the deck.

In some examples, the linkage information stored as a queue of tasks can be revisited in planning sessions or during operations to provide accurate and timely communication of information.

The equipment-based prioritisation table, as previously described, may be presented as an interactive table that can be aggregated at multiple levels, the dataset may also be presented as interactive spatial heatmaps.

Dataset queries may be designed to cater for specific operational objectives where queries can fuse multiple sources of data, including but not limited to: equipment type, equipment risk, substrate type, surface corrosion extent, spatial information including accessibility due to height.

An example query designed for painting operations may be defined such that areas are subdivided into smaller regions where the light corrosion is aggregated to provide the most suitable areas for the next paint operation, the query may be extended to take into account access height, to provide prioritisation of painting with and without specialised staff and/or equipment for working at height. When planning critical maintenance operations all high risk items, for example high pressure pipes, locations of any high severity corrosion will be flagged for high priority mitigation response.

System 300 may further include a quality assurance (QA) module 370.

QA module 370 is configured to identify areas/tasks in which system 300 performs in a suboptimal manner, and to adjust existing processes such that system 300 improves its performance on tasks. This process may be continual over the lifetime of system 300.

Figure 15:
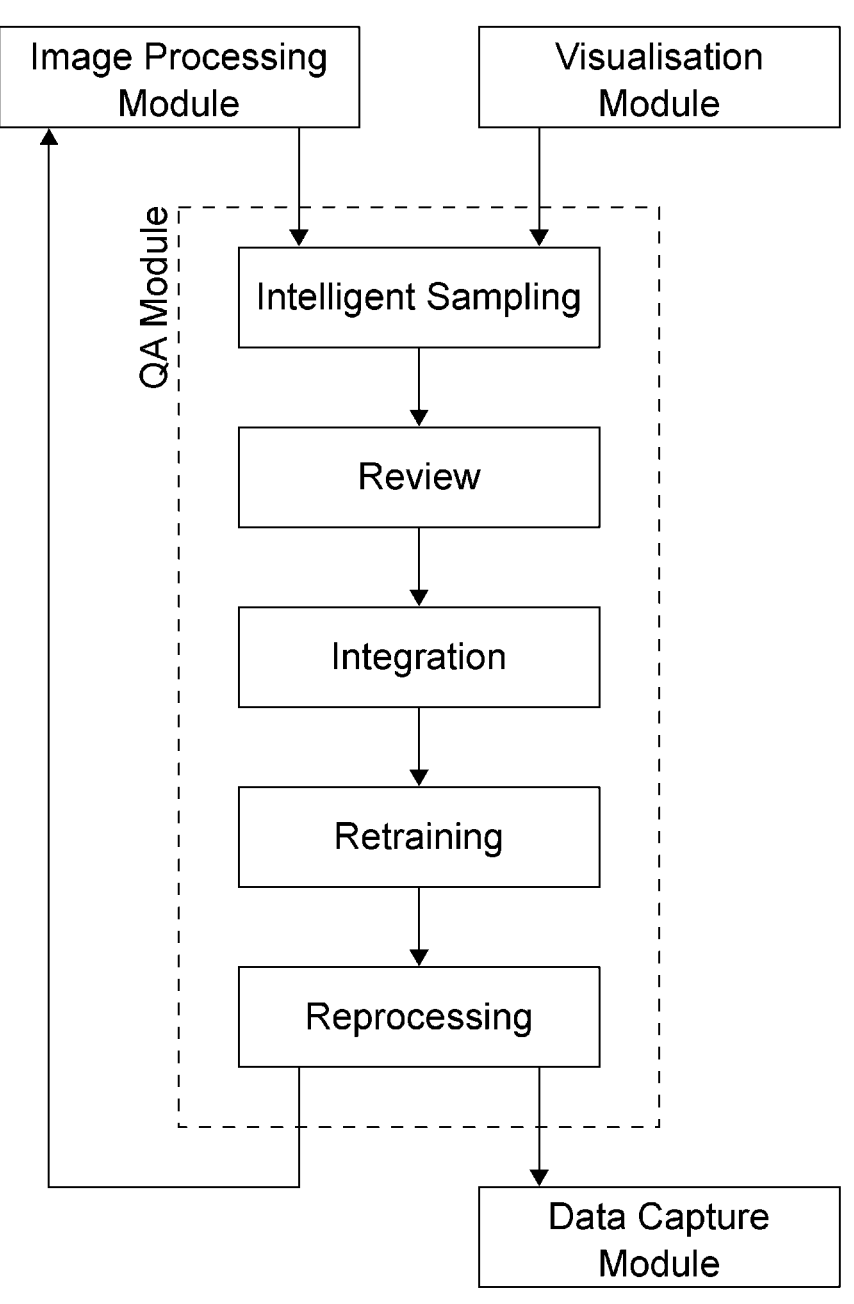
FIG. 15 illustrates an example flowchart of the operation of a quality assurance module of the system of FIG. 3.

Referring to FIG. 15, there is illustrated an example flowchart showing the operation of QA module 370.

Scene understanding techniques in the image processing module 330 may be continually updated throughout the operation and lifetime of system 300. ROIs may be assessed by their performance on the original tasks or derivative tasks. For example, predicted "defect" class ROIs may be selected by their ability to predict regions of "cracking" class. ROIs may be selected if their predictions are incorrect, or they may be identified by a low "confidence factor". Areas of suboptimal ROI performance can be intelligently identified with uncertainty sampling techniques (such as selecting ROIs with high entropy, collecting samples near neural network decision boundaries, least confidence strategies, or some other computed confidence factor, etc.), through automated feature sampling techniques (such as selecting ROIs that lie well outside the cluster of information a neural network has been trained upon), and may also be identified by interaction and feedback from stakeholders of system 300 (e.g. operators, client management, internal staff, etc.).

In some examples, a neural network is used to predict substrate condition on images. ROIs corresponding to areas of high entropy (i.e. low confidence) may be identified and extracted for subsequent review.

In some examples, for an intelligently sampled ROI instance the associated features for the predicted class are reviewed/changed by an annotator/SME. Reviewed ROIs are integrated into existing processes so that the class definition of the new associated feature provides a higher confidence factor for accurate identification of similar instances. This may include retraining an image segmentation network using the updated database, or further training a derivative image segmentation network to perform a different task.

In some examples, ROIs are reviewed manually, or by some other process. ROIs may be stored for later integration into existing processes. For example, results of the data-review may be added to an abundant database of ROIs used in neural network training and/or validation. New and/or derivative neural networks (i.e. those that perform other tasks related to fabric maintenance) may be trained using the updated database. In some examples, continual updating of a database of the abundant images occurs, where SMEs are asked to provide continual feedback to select ROIs.

In some examples, there is provided a method of active learning. The method comprises a first step, wherein a confidence factor for each pixel in an input image is computed for the output from an image segmentation neural network. A confidence factor may comprise one or more sampling metrics, such as an "uncertainty factor" indicating a likelihood that a region identified by the image segmentation process lies near a decision boundary (as calculated using probability or entropy), a "novelty factor" indicating the region identified by the segmentation process lies "far" away from previously observed data, and a "randomness factor" indicating random exploratory regions extracted from the unlabelled pool of data to encourage data exploration and avoid overfitting to a prior segmentation model. Regions with low confidence factor are extracted. The method further comprises a step wherein these regions are manually reviewed by a subject matter expert who annotates the regions. The method further comprises a step wherein the reviewed regions are integrated into the existing database of annotated regions. The method further comprises a step wherein an image segmentation neural network is trained using the updated and labelled region database. The method may then be repeated in order to provide for continuous active learning.

In some examples, there is provided a method for transferring learning. The method comprises a first step wherein regions containing nuts and/or bolts are extracted in response to a client wishing to detect corrosion on nuts and bolts, which has a different corrosion class definition. The method further comprises a step wherein the extracted regions are manually reviewed by a subject matter expert who annotates the regions with the appropriate class definition. The method further comprises a step of integrating the reviewed regions into an existing database of annotated regions. The method further comprises a step of training an image segmentation neural network using the updated and labelled region database. The method may then be repeated in order to provide continuous transfer of learning.

In some examples, there is a balance between operational performance and image segmentation evaluation metrics. A conventional method of measuring the performance of image segmentation methods is to compute the mean intersection-over-union (mIOU) for proposed regions (also known as the Jaccard index). Additionally, the hyperparameters (such as thresholds and class-weighting) used for various tasks are tailored to specific tasks. For instance, operationally, it may be critical to detect heavily damaged substrate and therefore more significant emphasis is placed on any errors there, whereas, conventionally, no weighting would be applied to a specific class.

The detection rate criteria refers to the rate at which processes executed by system 300 correctly draw attention to ROIs. For example, if a large region contains a defect and system 300 correctly identifies a portion of this region, the prediction is considered successful since operator attention is driven towards the problem area. Detection rates (i.e. recall) are calculated on a per-instance basis. Orthogonally, miss-fire rates (precision) would be the rate that predicted ROIs are true ROIs.

In some examples, a detection rate is defined as:

$$\text{Detection success } D = \begin{cases} 1, & |A \cap B| \geq \text{threshold} \\ 0, & |A \cap B| < \text{threshold} \end{cases}$$

where A is the ROI prediction and B is the true ROI (i.e. an ROI where a defect exists).

$$\text{Detection rate } \bar{D} = \frac{1}{N}\sum_{n=1}^{N} D_n$$

where N is the true number of ROIs.

$$\text{Misfire rate } \bar{R} = \frac{1}{M}\sum_{m=1}^{M} D_n$$

where M is the number of ROIs predicted by system 300.

In contrast to detection/miss-fire rates, coverage rates may be calculated on the overlap of predicted and true ROI area. Coverage rate per ROI is given by $C = |A \cap B|$. For example, if a predicted ROI overlaps a true ROI by 50%, then the coverage rate is 50%.

The different components and processes mentioned above can be substituted and tweaked depending on the application at hand. These include:

Support for different data collection modalities. The same processing framework can be applied to thermal or hyperspectral data, or on video data, which can be considered a sequence of images.

The core principles of this process can be applied to different applications beyond the offshore corrosion mapping mentioned above. For example, it can be extended to onshore production facilities to do fault mapping, or into the construction market vertical to monitor the health of a construction site.

The image processing algorithms that drive the analytics mentioned here are subject to change. For example, variants of a deep neural network may be used to drive the image segmentation process. However, this module is highly configurable and is able to utilise other machine learning or artificial intelligence architectures as needed.

The visualisation module 360 is optional and may be replaced with direct data delivery for integration for third-party consumption.

The processes described above are generally automated and are therefore flexible to be deployed in real-time (by reducing the extent of the QA process). When deployed onto a platform (automated or hand-held) at a production facility, analytics can be conducted quickly. This can enable actively guiding the data collection workflow to focus on areas of interest. For example, the software may request extra data to be collected in regions that look corroded or confusing. Or it will guide data collection in areas that are otherwise occluded or hidden to the cameras. Lastly, it can direct data collection areas that were previously prone to corrosion degradation by comparing against a previously collected database.

Optional embodiments may also be said to broadly include the parts, elements, steps and/or features referred to or indicated herein, individually or in any combination of two or more of the parts, elements, steps and/or features, and wherein specific integers are mentioned which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The invention claimed is:

1. A computer-implemented method comprising:
receiving image data of one or more artificial objects;
applying an image segmentation process to the image data to detect predetermined defects of the one or more artificial objects, wherein the image segmentation process identifies one or more regions of the image data determined to have a likelihood of showing one or more of the predetermined defects;
outputting the identified one or more regions;
receiving metadata of the one or more artificial objects, the metadata being associated with the image data, wherein the metadata comprises metadata of different categories;
associating each region of the one or more regions with the metadata;
aggregating the one or more regions based on the categories of the metadata to create an aggregated one or more regions; and
storing the aggregated one or more regions into a database of the predetermined defects;
wherein the image segmentation process determines severity metrics for the defects in the one or more regions, wherein a severity metric represents a severity or significance of a defect; and
wherein the image segmentation process further determines a confidence factor for each region of the one or more regions, wherein the confidence factor represents a likelihood of a presence of a predetermined defect in the region.

2. The method of claim 1, wherein the defects comprise at least one of corrosion, a crack, a blister, a bend, and a deformation in the one or more artificial objects.

3. The method of claim 1, wherein the image data is visual image data, thermal image data, hyperspectral image data, or 2D depth image data.

4. The method of claim 1, wherein the image data comprises a plurality of images, wherein each image of the plurality of images shows at least one object of the one or more artificial objects, and wherein at least two images of the plurality of images show a same object of the one or more artificial objects.

5. The method of claim 4, wherein the plurality of images are frames of a video, photographs, 2D images, 3D images, or spherical images.

6. The method of claim 4, wherein, prior to applying the image segmentation process, the method further comprises a step of processing the plurality of images to emphasise visual indications of the predetermined defects.

7. The method of claim 6, wherein processing the plurality of images comprises at least one of applying undistortion filters, brightening the images, adjusting a contrast of the images, resizing the images to a predetermined image size, cropping the images to retain predetermined areas of the images, image smoothing, applying a normalisation operation, applying a multiplication or convolution operation, applying a spatial filter, and applying a geometrical transformation to the image data.

8. The method of claim 1, wherein the image segmentation process is implemented by a region-based segmentation process, a mathematical morphology segmentation, a genetic algorithm-based segmentation, an artificial neural network-based segmentation, or a deep learning structure.

9. The method of claim 1, further comprising:
merging two or more regions of the identified regions into a single region using morphological operations; and
outputting the single region.

10. The method of claim 1, further comprising:
receiving risk profiles associated with the categories of the metadata;
ranking the one or more regions based on the risk profiles of the categories of the metadata associated with each region of the one or more regions; and
outputting a prioritisation table containing the one or more regions.

11. The method of claim 1, wherein the metadata comprises at least one of labels indicating a defect category, labels indicating an intervention for resolving a defect, labels identifying the one or more artificial objects, spatial metadata comprising a computer-aided design of the one or more artificial objects, and spatial metadata comprising a 3D LiDAR scan of the one or more artificial objects.

12. The method of claim 1, further comprising:
receiving 3D spatial data of the one or more artificial objects, the 3D spatial data being associated with the image data, wherein the 3D spatial data comprises 3D spatial data of different modalities;
aggregating image data representing different viewpoints of a same object of the one or more artificial objects based on the different modalities of the 3D spatial data; and
generating a 3D representation of the one or more regions and the one or more artificial objects using the aggregated image data and the 3D spatial data.

13. The method of claim 1, further comprising:
automatically identifying regions of uncertainty, wherein the regions of uncertainty are regions of the one or more regions in which the likelihood of showing one or more of the predetermined defects is below a likelihood threshold, or regions of the one or more regions having high entropy, or regions of the one or more regions representing samples near decision boundaries of the image segmentation process;

reviewing, by an operator, the regions of uncertainty;

in response to the one or more regions not having been correctly identified by the image segmentation process, marking, on the image data, one or more corrected regions to create marked image data showing one or more predetermined defects; and training the image segmentation process using the marked imaged data.

14. The method of claim 1, wherein the image segmentation process is trained by using at least one of:

a definition of a defect provided by a user;

image data showing the predetermined defects; and image data of the one or more artificial objects in which the predetermined defects have been marked by a user.

15. The method of claim 1, further comprising determining an evaluation metric for the image segmentation process comprising determining an area of intersection between:

a region of the one or more regions; and a region of the image data actually showing the one or more predetermined defects determined by the image segmentation process to be shown in the region of the one or more regions.

16. A system comprising at least one processing system configured to:

receive image data of one or more artificial objects;

apply an image segmentation process to the image data to detect predetermined defects of the one or more artificial objects, wherein the image segmentation process identifies one or more regions of the image data determined to have a likelihood of showing one or more of the predetermined defects;

output the identified one or more regions;

receive metadata of the one or more artificial objects, the metadata being associated with the image data, wherein the metadata comprises metadata of different categories;

associate each region of the one or more regions with the metadata;

aggregate the one or more regions based on the categories of the metadata to create an aggregated one or more regions; and store the aggregated one or more regions into a database of the predetermined defects;

wherein the image segmentation process determines severity metrics for the defects in the one or more regions, wherein a severity metric represents a severity or significance of a defect; and wherein the image segmentation process further determines a confidence factor for each region of the one or more regions, wherein the confidence factor represents a likelihood of a presence of a predetermined defect in the region.

17. The system of claim 16, wherein the defects comprise at least one of corrosion, a crack, a blister, a bend, and a deformation in the one or more artificial objects.

18. The system of claim 16, wherein the image data is visual image data, thermal image data, hyperspectral image data, or 2D depth image data.

19. The system of claim 16, wherein the image data comprises a plurality of images, wherein each image of the plurality of images shows at least one object of the one or more artificial objects, and wherein at least two images of the plurality of images show a same object of the one or more artificial objects.

20. The system of claim 19, wherein the plurality of images are frames of a video, photographs, 2D images, 3D images, or spherical images.

21. The system of claim 19, wherein, prior to applying the image segmentation process, the at least one processing system is further configured to process the plurality of images to emphasise visual indications of the predetermined defects.

22. The system of claim 21, wherein processing the plurality of images comprises at least one of applying undistortion filters, brightening the images, adjusting a contrast of the images, resizing the images to a predetermined image size, cropping the images to retain predetermined areas of the images, image smoothing, applying a normalisation operation, applying a multiplication or convolution operation, applying a spatial filter, and applying a geometrical transformation to the image data.

23. The system of claim 16, wherein the image segmentation process is implemented by a region-based segmentation process, a mathematical morphology segmentation, a genetic algorithm-based segmentation, an artificial neural network-based segmentation, or a deep learning structure.

24. The system of claim 16, the at least one processing system being further configured to:

merge two or more regions of the identified regions into a single region using morphological operations; and output the single region.

25. The system of claim 17, the at least one processing system being further configured to:

receive risk profiles associated with the categories of the metadata;

rank the one or more regions based on the risk profiles of the categories of the metadata associated with each region of the one or more regions; and output a prioritisation table containing the one or more regions.

26. The system of claim 17, wherein the metadata comprises at least one of labels indicating a defect category, labels indicating an intervention for resolving a defect, labels identifying the one or more artificial objects, spatial metadata comprising a computer-aided design of the one or more artificial objects, and spatial metadata comprising a 3D LiDAR scan of the one or more artificial objects.

27. The system of claim 16, the at least one processing system being further configured to:

receive 3D spatial data of the one or more artificial objects, the 3D spatial data being associated with the image data, wherein the 3D spatial data comprises 3D spatial data of different modalities;

aggregate image data representing different viewpoints of a same object of the one or more artificial objects based on the different modalities of the 3D spatial data; and generate a 3D representation of the one or more regions and the one or more artificial objects using the aggregated image data and the 3D spatial data.

28. The system of claim 16, the at least one processing system being further configured to:

automatically identify regions of uncertainty, wherein the regions of uncertainty are regions of the one or more regions in which the likelihood of showing one or more of the predetermined defects is below a likelihood threshold, or regions of the one or more regions having high entropy, or regions of the one or more regions representing samples near decision boundaries of the image segmentation process;

send the regions of uncertainty to an operator for review;

in response to the one or more regions not having been correctly identified by the image segmentation process, mark, on the image data, one or more corrected regions showing one or more predetermined defects to create marked image data; and train the image segmentation process using the marked imaged data.

29. The system of claim 16, wherein the image segmentation process is trained by using at least one of:

a definition of a defect provided by a user;

image data showing the predetermined defects; and image data of the one or more artificial objects in which the predetermined defects have been marked by a user.

30. The system of claim 16, the at least one processing system being further configured to determine an evaluation metric for the image segmentation process comprising determining an area of intersection between:

a region of the one or more regions; and a region of the image data actually showing the one or more predetermined defects determined by the image segmentation process to be shown in the region of the one or more regions.

\* \* \* \* \*